United States Patent [19]

McAlpin et al.

[11] Patent Number: 4,710,540

[45] Date of Patent: Dec. 1, 1987

[54] COMPOSITION FOR PREPARING CEMENT-ADHESIVE REINFORCING FIBERS

[75] Inventors: James J. McAlpin; Wai Y. Chow, both of Houston, Tex.

[73] Assignee: Exxon Chemical Patents Inc., Linden, N.J.

[21] Appl. No.: 816,032

[22] Filed: Jan. 3, 1986

[51] Int. Cl.$^4$ .............................................. C08F 8/00
[52] U.S. Cl. ........................................ 525/101; 106/90; 106/99; 524/3; 524/506; 524/528; 525/106; 525/193

[58] Field of Search ...................... 525/101, 106, 193

[56] References Cited

U.S. PATENT DOCUMENTS

| | | | |
|---|---|---|---|
| 2,973,344 | 2/1961 | Fasce | 260/78.4 |
| 3,408,420 | 10/1968 | Wiggill | 525/106 |
| 3,427,187 | 2/1969 | Wiggill | 117/118 |
| 3,505,279 | 4/1970 | Preston et al. | 525/106 |
| 3,591,395 | 7/1971 | Zonsveld et al. | 106/99 |
| 3,644,141 | 2/1972 | Preston | 525/106 |
| 3,645,961 | 2/1972 | Goldfein | 260/37 N |
| 4,146,529 | 3/1979 | Yamamoto et al. | 260/42.18 |
| 4,261,754 | 4/1981 | Krenchel et al. | 106/90 |
| 4,339,273 | 7/1982 | Meier et al. | 106/90 |
| 4,363,666 | 12/1982 | Johnson et al. | 106/90 |
| 4,414,030 | 11/1983 | Restrepo | 106/90 |
| 4,428,775 | 1/1984 | Johnson et al. | 106/90 |
| 4,477,522 | 10/1984 | Sheehan | 428/359 |

FOREIGN PATENT DOCUMENTS

| | | |
|---|---|---|
| 0026581 | 9/1980 | European Pat. Off. . |
| 2021552 | 12/1979 | United Kingdom . |
| 2030891 | 4/1980 | United Kingdom . |
| 2134556 | 8/1984 | United Kingdom . |
| 2143226 | 2/1985 | United Kingdom . |

OTHER PUBLICATIONS

Derwent Abstract 85-119970/20 (English Language Abstract of Japanese Patent Publication 60 060 960).
Derwent Abstracts 36000U-AL (English Language Abstract of Japanese Patent Publication 7319849).
Derwent Abstract 04446W/03 (English Language Abstract of Japanese Patent Publication 49036748).
Derwent Abstract 48010Y/27 (English Language Abstract of Japanese Patent Publication 52 063 948).
Derwent Abstract 32024C/18 (English Language Abstract of Japanese Patent Publication 550 40 719).
Derwent Abstract 85-149063/25 (English Language Abstract of Japanese Patent Publication 60 081 052).
Derwent Abstract 39642 E/20 (English Language Abstract of Europaische Patentanmeldung 0051256).
Derwent Abstract 83-783538/41 (English Language Abstract of Offenlegungsschrift 3210693).
Derwent Abstract 85-135565/23 (English Language Abstract of Offenlegungsschrift 3341462).

*Primary Examiner*—Joseph L. Schofer
*Assistant Examiner*—Bernard Lipman
*Attorney, Agent, or Firm*—M. B. Kurtzman

[57] ABSTRACT

A modifier composition is disclosed for compounding with a polyolefin to produce a resin from which cement adherent polyolefin fibers may be produced by conventional fiber forming methods. The modifier composition comprises the reaction product obtained from the high shear dry blending of an alkylamino alkoxysilane with an acid modified polyolefin, preferably γ-aminopropyltriethoxysilane dry blended with maleated polypropylene. Such modifier composition when compounded in from about 1 to about 5 weight percent with a polyolefin, preferably polypropylene, provides a resin from which cement adherent fibers may be produced.

13 Claims, 3 Drawing Figures

COMPOSITION FOR PREPARING CEMENT-ADHESIVE REINFORCING FIBERS

FIELD OF THE INVENTION

This invention relates to an alkoxysilane containing polyolefin composition which renders polyolefins highly adherent for silicic surfaces. When compounded with a polyolefin the modifier composition of the invention provides a polyolefin resin from which cement adherent reinforcing fibers may be prepared which suitably substitute for asbestos fibers as a fibrous reinforcement for cement structures. Alternatively, the modifier composition may be applied as a coextruded surface coating to polyolefin fibers or as a surface layer to a polyolefin film from which fibers are prepared by fibrillation. The invention also relates to the cement adherent polyolefin fibers so prepared and to cementitious articles prepared with such cement adherent polyolefin reinforcing fibers.

BACKGROUND OF THE INVENTION

Fibrous reinforcement is a well known method for improving the physical properties of cement and concrete structures. Asbestos fiber-reinforced cements have been widely employed as building materials. Asbestos-reinforced cements and concretes have long been used for the production of pipes, corrugated boards, roofing slates, machine foundations, storage tank walls, reactors, aircraft runways, roads, pilings and many other high strength articles. The type of asbestos which is satisfactory as fibrous reinforcement for cement is available in limited quantities. It is probable that the deposits of such workable asbestos will be exhausted relatively soon. Further, asbestos is now known to have carcinogenic effects. The carcinogenic properties of asbestos has lead to governmental regulations controlling and limiting its use.

Of the fibers currently used as an asbestos fiber replacement for cement reinforcement, polyacrylonitrile and polyvinyl alcohol fibers are preferred because they combine high fiber strength with good adhesion to a cement matrix. Unfortunately, both are expensive materials and significantly increase the cost of producing fiber reinforced cement structures.

A variety of other less-expensive materials have been considered for production of cement reinforcement fibers to replace asbestos-fibers. Steel fibers have been tried and found inadequate because they suffer from chemical attack by the alkaline cement environment. Various polymeric fibers have also been found to be inadequate. Glass and polyester fibers degrade due to the alkaline environment of the cement matrix. Nylon and cellulose fibers have been found to be too water sensitive to be successfully used.

Ideally, polyolefin fibers could be employed as an asbestos replacement for reinforced cement. Polyolefin fibers possess good inherent properties, such as alkaline resistance, good stiffness and tensile strengths and are relatively inexpensive. Unfortunately, a major obstacle to the use of polyolefins as a cement reinforcing fiber material is their inherent lack of affinity towards an alkaline mineral matrix. Further, polyolefin fibers are less dense than a cement slurry; that low density in combination with polyolefin's lack of affinity for a cement matrix allows polyolefin fibers to float to the slurry surface. Such poor dispersibility of polyolefin fibers results in poor reinforcement of a finished cementitious article.

Extensive efforts have been devoted to preparing polyolefin fibers, particularly polypropylene fibers, in a form which permits them to be successfully used as a replacement for asbestos fibers for reinforcement of cement and concrete structures.

Methods for fabricating polypropylene fibers in a way as to provide physical anchoring sites along the fibers for mechanical attachment of the cement matrix have been tried, as illustrated by U.S. Pat. Nos. 4,261,754; 4,414,030 and 4,477,522. European Patent Application No. 0 026 581 discloses that such fibers may be prepared by fibrillation of a polyolefin film which has been pretreated with a coupling agent such as an acid anhydride or methacryloxypropyltrimethoxysilane. Other methods involve the addition of certain thickening and clay additives to the cement slurry to hold the polypropylene reinforcing fibers in dispersion until the slurry sets, as illustrated by U.S. Pat. Nos. 4,363,666 and 4,428,775. Still another method to improve flocculation of polypropylene fibers when mixing with cement is to treat the cement-fiber mix with a water-soluble or emulsifiable polymer and a polyvalent salt such as $Al_2(SO_4)_3$, as illustrated by U.S. Pat. No. 4,339,273.

Other procedures designed to render polypropylene fibers suitable as a cement reinforcing material involve the physical modification of the fiber surface by various means. To produce cement adherent fibers U.K. Patent Application No. 2,030,891 teaches a method for embedding inorganic powers in the surface of fibrillated polypropylene. Japanese Patent Publication No. 60 060 960 applies a fine aggregate to the fiber surface by means of a radiation hardenably epoxy binder to produce a cement adherent polypropylene reinforcing fiber.

Still other methods chemically treat the surface of polyolefin fibers to render the fiber surface more adherent to cement. Such methods include treatment of the polyolefin fibers with an aqueous dispersion of colloidal alumina or silica in conjunction with a chlorinated polypropylene, as taught by Japanese Patent Publication No. 7319849; a non-ionic or cationic polymer agglutinating agent such as a polyethylene oxide or poly(alkylaminoacrylate) as shown by Japanese Patent Publication No. 60 081 052; or a solution of an alkali or alkaline earth metal (bi) carbonate as disclosed in Belgium Patent No. 899,810.

Yet others have suggested chemical modifications of the base polyolefin from which the fibers are produced. Hence, U.K. Patent Application No. 2,021,552A states that an inorganic or organic acid group should be incorporated in the base polyolefin, either by copolymerization of acid monomers or by grafting acid groups to a prepared polyolefin, in order to improve the adherence to cement of fibers made of modified polyolefin. Polypropylene grafted with maleic anhydride is illustrated as an example of an improved material for producing cement reinforcing fibers. Japanese Patent Publication No. 49 036 748 also illustrates the use of maleated polypropylene as a material for producing cement reinforcing fibers. Another approach, as discussed in German Offenlegungsschrift DE 3341 462 A1, treats the polyolefin under elevated temperature and pressure with a solution of silane or $SiCl_4$ together with silicic acid or a metal silicate and thereafter precipitates the reaction product as fibrils by lowering the temperature. The fibrils so produced are useful as asbestos fibers substitutes for reinforced cement structures.

Others have suggested that the surface of polyolefin fibers be catalytically reacted with reactive organic or inorganic Si (IV) compounds to render them adhesive to cement. Among the silanes disclosed as suitable for a method of this type are silicic acid anhydrides, organic halosilances, and silicate esters as discussed in European Patent Application No. 0 051 256 and German Offenlegungsschrift DE No. 32 10693 A1.

To date, polyolefin fibers have been made compatible as reinforcement fiber for cement only by incorporating additional compatibilizing agents into the cement slurry into which the fibers are admixed, by the special fabrication of the fibers to provide physical anchoring sites therein for mechanically anchoring to the cement matrix, by the chemical modification of the base polyolefin from which the fibers are then produced, or by the chemical modification of the fiber surfaces by costly and time consuming chemical reactions.

Ideally an agent could be found which when admixed in small quantities with a polyolefin stock material would allow the direct production of cement adherent fibers therefrom by conventional fiber production techniques. To date, no such additive has been disclosed by the art.

SUMMARY OF THE INVENTION

A composition has been found which may be compounded with an olefinic polymer to provide a polyolefin resin from which cement-adherent fibers may be directly produced by conventional fiber fabricating techniques. The modifier composition comprises the reaction product which results upon the high shear dry blending of an alkylamino alkoxysilane with an acid modified polyolefin. A preferred modifier composition is the dry blend reaction product of γ-aminopropyltriethoxysilane with a maleated polypropylene.

The modifier composition may be dry blended in small amounts with an olefin homopolymer or copolymer to provide a polyolefin resin stock from which cement adherent fibers may be directly produced by conventional fiber extruding, spinning or fibrillation techniques. Alternatively, the modifier composition or a dilution thereof may be coextruded as a surface layer upon an olefin polymer film and cement adherent fibers may be produced from said film by fibrillation techniques.

Fibers produced from a polyolefin resin which incorporates a modifier composition of the invention are adherent to cements and concretes and may be used as a substitute for asbestos fibers for the fibrous reinforcement of cement and concrete articles. Polyolefin reinforcing fibers produced in accordance with the invention impart superior strengths to finished reinforced cement articles as compared to articles reinforced with fibers produced only from an acid modified polyolefin.

DETAILED DESCRIPTION OF THE PREFERRED EMBODIMENT

Figure 1:
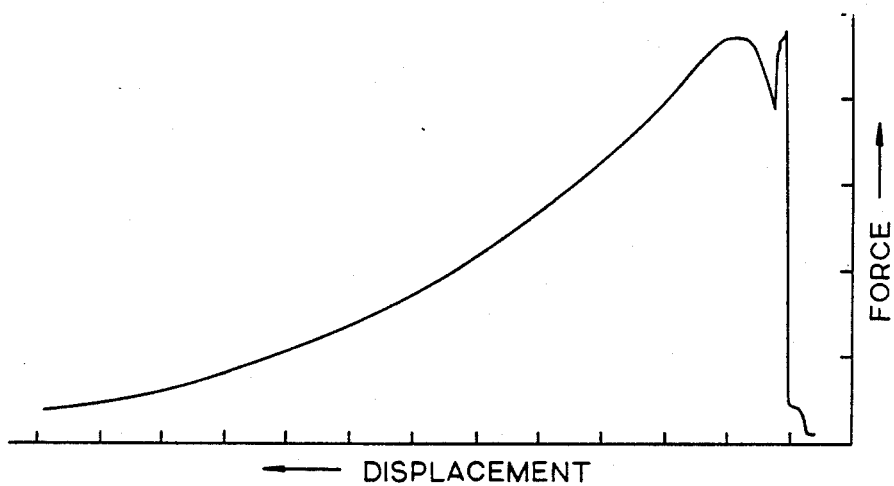
FIG. 1 is the force-displacement curve obtained upon a bending test in a horizontal configuration of a concrete test bar reinforced with 4 volume percent polypropylene fibers containing a modifier composition in accordance with the invention.

Any polyolefin may be rendered suitable for production of cement adherent fibers by the addition thereto of a modifying agent of the invention. Examples of suitable polyolefins are polyethylene; polypropylene; polybutene; olefinic copolymers; olefinic terpolymers; or mixtures and blends of the above olefinic polymers. In view of its good intrinsic physical and chemical properties polypropylene and its copolymers is a preferred material for the production of concrete adhesive reinforcing fibers.

The modifying agent which is compounded with a polyolefin to render it adhesive to cement comprises a dry blend reaction product of an alkylamino alkoxysilane with an acid modified olefinic polymer, copolymer or terpolymer. An alkylamino alkoxysilane is defined herein to mean a Si(IV) compound of the following structure:

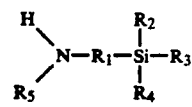

wherein $R_1$ is an alkylene or alkyl arylene group having from about 1 to about 10 carbon atoms and preferably from about 3 to about 8 carbon atoms; and $R_2$, $R_3$ and $R_4$ are each independently hydrogen, alkyl or alkoxy groups with the proviso that at least one (preferably all three) of $R_2$, $R_3$, $R_4$ must be an alkoxy group; and $R_5$ is hydrogen, alkyl, aryl or a substituted version thereof. An acid modified polyolefin as defined herein means an olefinic homopolymer, copolymer or terpolymer which contains from about 0.4 wt % to about 8.0 wt % pendant acid functional groups as free carboxylic acid or as carboxylic acid anhydride.

Surprisingly, it has been found that the amino group of an alkylamino alkoxysilane when mixed by high shear dry blending with an acid modified polyolefin will react with the acid functionality of the modified polyolefin without further requirements of a catalyst, solution or extremes of temperature. The resulting modifier composition comprises an alkoxysilane amide or imide adduct of a polyolefin which, in accordance with the invention, may inexpensively be prepared in bulk quantities with readily available dry blend mixing equipment.

A polyolefin resin for production of cement adherent fibers may readily be prepared by blending the modifier composition with an olefinic polymer. The modifier is intimately and homogeneously admixed with the base polyolefin compound to form a resin from which fibers are subsequently produced. Fibers produced from such modified polyolefin resin exhibit a rougher surface texture than fibers produced from a polyolefin not containing the modifier agent. This is believed to be due to the migration of the modifier agent from the polymer matrix of the fiber core to the surface of the fiber during fiber forming or film production from the resin. This migration or blooming phenomena is believed to account for the fact that a small amount of the modifier agent may be incorporated into a polyolefin resin yet significantly increased adhesion of fibers produced therefrom towards cement is still achieved.

The acid modified polyolefins which may be employed to produce the modifier agents of the invention are those acid modified poly α-olefins or mixtures thereof; such as acid modified polyethylene, polypropylene, polybutene-1, and olefinic copolymers. The acid modified polyolefins are known materials and may be prepared by known procedures, as disclosed for example in U.S. Pat. No. 2,973,344. The unsaturated alpha-beta carboxylic acids and acid anhydrides useful for forming the acid modified polyolefins are exemplified by acrylic acid, maleic acid, fumaric acid, itaconic acid, citraconic acid, methacrylic acid, crotonic acid, isocrotonic acid, maleic anhydride, itaconic anhydride, citraconic anhydride and himic anhydride. Preferably, to insure that the modifier agent produced from such acid modified polyolefins will readily migrate or bloom to the surface of a polyolefin fiber, the polyolefin portion of the acid modified polyolefin used to produce the modifier desirably has a number average molecular weight of from about 2,500 to about 30,000. If the molecular weight of the polyolefin portion of the acid modified polyolefin exceeds about 30,000 there is a reduction in effectiveness probably associated with the reduced mobility of the larger molecule. Of course, acid modified polyolefins having a molecular weight in excess of 30,000 may be used to prepare modifiers of the invention, but in such case it is desirable to incorporate such higher molecular weight modifier composition into the base polyolefin as a coextruded layer upon a polyolefin film from which fibers are subsequently produced by fibrillation.

Alternatively, if the acid modified polyolefin is a polyethylene it may be produced by the copolymerization of ethylene monomer with from about 0.1 to about 25 mole percent of an acid olefin comonomer. Examples of copolymer suitable as the acid modified polyolefin include copolymer of ethylene with acrylic acid, methacrylic acid, itaconic acid, malonoic acid and methymethacrylic acid.

The acid content of the acid modified polyolefin may range from about 0.4 to about 8.0 weight percent, or from about 0.0017 to about 0.033 mole percent, depending upon the average molecular weight of the polyolefin component. As noted, the molecular weight of the polyolefin component, particularly wherein the polyolefin component is polypropylene, would desirably be from about 2,500 to about 30,000 and most desirably be from about 5,000 to about 10,000. The content of the acid component should preferably be selected to provide on the average from one to two pendant acid group per polymer chain. Although an acid modified polyolefin may be used which has an acid modifying content which exceeds on average two pendant acid groups per polymer chain, generally no significant additional benefit is observed from the excess amount of acid component. The preferred acid modified polyolefin is a maleic anhydride modified polypropylene, such as a 5000 molecular weight polypropylene with an acid number of about 40, as marketed by Eastman Chemicals as Epolene-43.

Examples of alkylamino alkoxysilanes which may be used to prepare modifier compositions of the invention included the classes of alkylamino alkyldialkoxysilanes exemplified by a γ-aminoalkyl-methyldimethoxy silane and γ-aminoalkyl-methydiethoxysilane such as γ-aminopropylmethydimethoxysilane; γ-aminoalkyl trialkoxysilanes as exemplified by γ-aminopropyl triethoxysilane; N-aminoalkyl substituted γ-aminoalkyl dialkoxy-silanes such as N-(β-aminoethyl)-Y-aminopropyl methydimethoxysilane or N-aminoalkyl substituted γ-amino alkyl trialkoxysilanes such as N-(β-amino ethyl)-γ-aminopropyltriethoxysilane. The class of aminoalkyl trialkoxysilanes is preferred with γ-aminopropyltriethoxysilane as the compound of choice.

The modifier composition is prepared by dry blending a suitable acid modified polyolefin, preferably in powder form, with from about 50 to about 150%, and preferably from about 50 to about 100% of the stoichometric amount of alkylamino alkoxysilane required to react with the acid functionality of the acid modified polyolefin. Wherein the acid modified polyolefin is a maleated polypropylene such as Epolene-43, it is preferably blended with from about 3 to about 5 weight percent of the alkylamino alkoxysilane, preferably γ-aminopropyl triethoxysilane. Dry blending is preferably performed by a high shear mixing method such as is obtained in a double-arm mixer, or a horizontal stationary cylindrical mixer. Frictional heat produced by such dry blending is sufficient to initiate the occurrence of reaction between the amino functionality of the silane compound and the acid functionality of the acid modified polyolefin. The heat of reaction aids in maintaining the course of the amidation or imidation reaction during dry blending. Upon completion of the dry blending operation, it is preferred to maintain the powder mixture at a slightly elevated temperature from about 30° to about 90° C., and preferably about 60° C., for several hours to ensure the completion of reaction.

A polyolefin resin for production of cement adherent fibers is prepared by mixing from about 2 to about 50 melt index polyolefin, such as polypropylene, with from about 0.5 to about 5 wt % of the modifier composition. Preferably the polypropylene has a melt index of from about 2 to about 10. Generally, modifier contents of from about 1 to about 3 wt % provide the resulting polyolefin resin with more than adequate adhesion toward cement. The modifier may be compounded with the polyolefin in a single-screw or twin-screw extruder of co-rotating or counter-rotating design, extruded to strands and pelletized by a hot die face cutting or a cold cutting system.

The pelletized modified resin may be used as the feed stock for fiber production by any of the conventional fiber forming methods. Filaments of the so modified polyolefin resin may be prepared by melt-spinning techniques or by film slitting.

If desired, the modified resin may be continuously prepared and fed directly to the fiber forming process. The intermediate operation of preparing the resin in pelletized feed stock form may be omitted. Likewise, the modifier composition need not be separately prepared, but may be formed in situ by direct compounding of the requisite quantities of acid modified polyolefin and alkylamino alkoxysilane with the base polyolefin compound.

The cement adherent reinforcing fibers formed from the modified polyolefin resin should be prepared as a 1 to 100 denier fiber, preferably from about 2 to about 80 denier, with the preferred fiber size being dictated by the details of the cementitious matrix. The fibers may be prepared in any length, but lengths of from about ¼ to 3 inches are preferred, and most preferred are fiber lengths of from about ¼ to 1 inch.

Cement adherent polyolefin reinforcing fibers prepared in accordance with the invention are suitable for reinforcement all common cement compositions, such as Portland cements, marble cement, puzzolanic cement, trass cement, blast furnace cement, gypsum cements, calcium silicates and others. In addition to the reinforcing polyolefin fibers of the invention the cement composition may contain further additives and fillers such as fly ash, limestone, quartz, pearlite, rock wool, cellulose, diatomaceous earth, flue dust, pozzolana or mixtures thereof.

Reinforced cement articles are prepared by mixing polyolefin reinforcing fibers of the invention with the cement slurry in fiber amounts of from about 0.5 to about 20 percent by volume (dry basis), preferably from about 1 to about 10 percent by volume, and most preferably in fiber amounts of from about 2 to about 8 percent by volume.

EXAMPLE

A modifier composition was prepared by mixing 4.5 parts by weight of amino propyl tri-ethoxy silane and 95.5 parts by weight of maleated polypropylene (Eastman Chemicals' Epolene-43, MW=5000, acid number about 40 in a lab Waring blender. The resulting mix was then stored at 60° C. for several hours to allow the reaction between the anhydride and the amine to proceed to completion. Next, 1.65 parts by weight of the resulting modifier composition was blended with 98.35 parts by weight of a 3 melt flow rate polypropylene and the blend pelletized in a small single screw extruder.

The pelletized modified polypropylene resin was then extruded into film; the film was oriented, fibrillated and chopped into staple fiber of about 20 denier and 6 mm length. This staple was randomly dispersed in a concrete made by mixing Portland cement type P-40, fine sand type 0000 and water (according to Norm NBN B.12-208; consistency 1.5 as described in Norm NBN B 14-207). The fiber was present in the final formulation to the extent of 4 vol %. Test bars of 15.5 cm length, 2 cm width and 1 cm height were molded from the concrete. The bars were cured in water and then in a wet chamber (as per Norm NBN B.12-208).

Comparison samples were prepared by producing staple fibers in a manner identical to that described above from an unmodified 3 melt flow rate polypropylene and from polypropylene compounded to a resin with 1.65 parts of a maleated polypropylene (Epolene-43). Concrete test bar specimens embodying the unmodified fibers were prepared in exactly the way described above.

Figure 2:
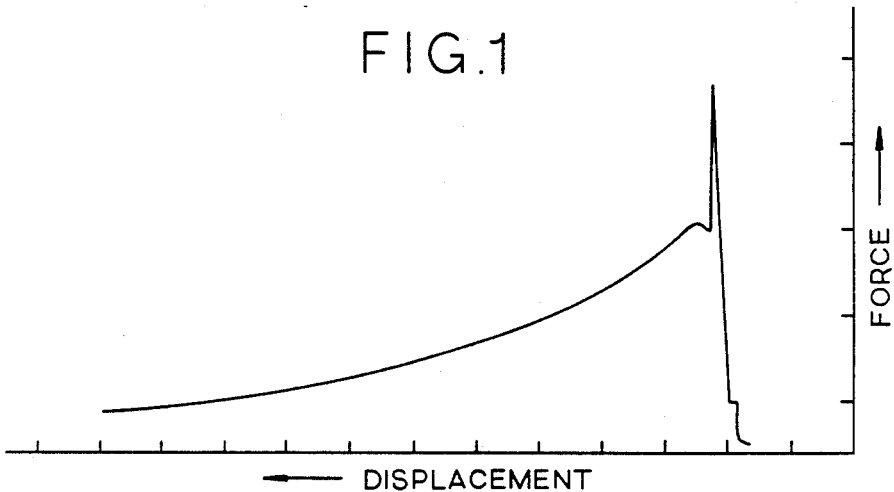
FIG. 2 is the force-displacement curve obtained upon a bending test in a horizontal configuration of a concrete test bar reinforced with 4 volume percent polypropylene fibers not containing any modifying composition of any type.
Figure 3:
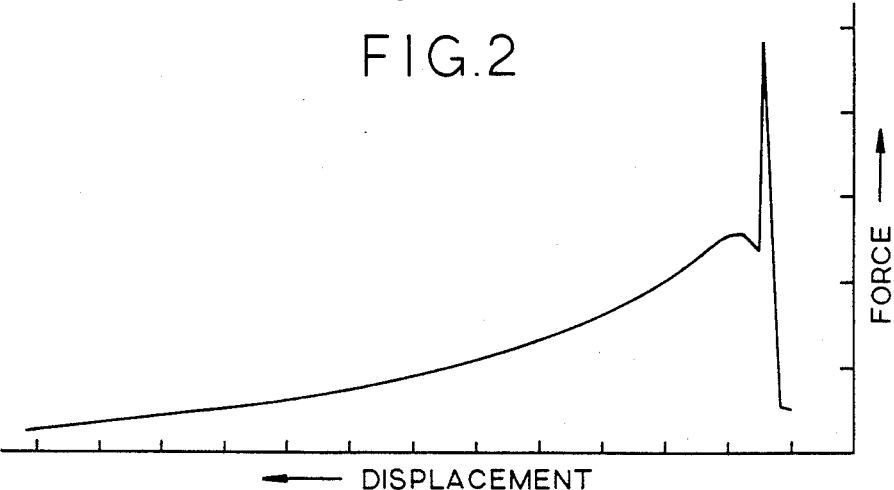
FIG. 3 is the force-displacement curve obtained upon a bending test in a horizontal configuration of a concrete test bar reinforced with 4 volume percent polypropylene fibers containing an amount of maleated polypropylene equal to the amount of modifier composition contained by the fibers used to reinforce the concrete test bar of FIG. 1.

The cured bars were then subjected to a bending test in a horizontal configuration with a support near each end of the bar and the load applied from the top in the center of the bar. The force-displacement results are displayed in FIGS. 1, 2 and 3. FIG. 1 give the results for the bars reinforced with the modified polypropylene fibers of the present invention. FIG. 2 represents the results for the comparison sample using unmodified polypropylene fibers as the reinforcing agent. FIG. 3 represents the results for the comparison sample using a polypropylene fiber containing an amount of maleated polypropylene equivalent to the amount of modifier composition contained in the modified polypropylene fibers of Sample 1.

In a test of this type, the area under the force-displacement curve correlates directly with toughness and extensibility in actual application. Comparing FIGS. 1 and 2, an increase of at least 100% is seen in this critical area measurement in going from the unmodified fiber specimen to the material based on the fibers of the present invention. Comparison of FIG. 2 to FIG. 3 demonstrates that addition of only a maleated polypropylene to the polypropylene fiber resin actually decreases the adherence of such fibers for cement.

The invention has been described and disclosed with reference to various of its particular and preferred embodiments. Upon reading and understanding this disclosure a person of ordinary skill in the art may appreciate that various modifications and changes may be made in the practice of the invention compared to the particular and preferred embodiments as described herein which do not depart from the scope and spirit of the invention as described above or claimed hereafter.

We claim:
1. A polyolefin resin from which concrete adherent fibers may be produced, comprising:
   from about 95 wt % to about 99 wt % of a olefinic polymer;
   from about 1 wt % to about 5 wt % of a modifying agent in intimate admixture with said olefinic polymer, said modifying agent comprising the reaction product resulting from dry blending of an alkylamino alkoxysilane with an acid modified polyolefin in an amount of from about 50 to about 150% of the stoichiometric amount required to react with the acid functionality of the acid modified polyolefin.
2. The polyolefin resin of claim 1 wherein the olefinic polymer is polypropylene.
3. The polyolefin resin of claim 2 wherein the polypropylene has a melt index of from about 2 to about 50.
4. The polyolefin resin of claim 3 wherein the acid modified polyolefin is a maleated polypropylene.
5. The polyolefin resin of claim 4 wherein the maleated polypropylene has a number average molecular weight of from about 2,500 to about 30,000.
6. The polyolefin resin of claim 5 wherein the succinic anhydride content of the maleated polypropylene is from about 0.4 to about 8.0 weight percent.
7. The polyolefin resin of claim 6 wherein the alkamino alkoxysilane is γ-aminopropyl triethoxysilane.
8. The polyolefin resin of claim 7 wherein the succinic anhydride content of the maleated polypropylene is about 4 weight percent.
9. The polyolefin resin of claim 8 wherein the γ-aminopropyl triethoxysilane is from about 3 to about 5 weight percent of the composition.
10. Concrete adherent polyolefin fibers for reinforcement of concrete articles, comprising:
    fibers composed of from about 95 wt % to about 99 wt % of an olefinic polymer containing from about 1 wt % to about 5 wt % of a modifying agent comprising the reaction product resulting from dry blending of an alkylamino alkoxysilane with an acid modified polyolefin in an amount of from about 50 to about 150% of the stoichiometric amount required to react with the acid functionality of the acid modified polyolefin.
11. The fibers of claim 10 wherein the acid modified polyolefin is a maleated polypropylene.
12. The fibers of claim 11 wherein the olefinic polymer is a polypropylene having a melt index of from about 2 to about 10 and the alkylamino alkoxysilane is γ-aminopropyltriethoxysilane.
13. The fibers of claim 12 wherein the fibers are from about 2 to about 80 denier.

* * * * *